(12) United States Patent
Laws (10) Patent No.: US 11,851,857 B2
(45) Date of Patent: Dec. 26, 2023

(54) COUPLING DEVICE AND SELF-SEALING VALVE ASSEMBLIES FOR CONNECTING AND DISCONNECTING A HOSE TO A FIRE HYDRANT

(71) Applicant: Robert Laws, Chicago, IL (US)

(72) Inventor: Robert Laws, Chicago, IL (US)

( * ) Notice: Subject to any disclaimer, the term of this patent is extended or adjusted under 35 U.S.C. 154(b) by 0 days.

(21) Appl. No.: 17/889,682

(22) Filed: Aug. 17, 2022

(65) Prior Publication Data

US 2023/0081788 A1 Mar. 16, 2023

Related U.S. Application Data

(60) Provisional application No. 63/243,276, filed on Sep. 13, 2021.

(51) Int. Cl.
*E03B 9/02* (2006.01)
*F16L 37/46* (2006.01)
*F16L 37/47* (2006.01)

(52) U.S. Cl.
CPC ............... *E03B 9/02* (2013.01); *F16L 37/46* (2013.01); *E03B 2009/022* (2013.01); *F16L 37/47* (2013.01)

(58) Field of Classification Search
CPC ............ E03B 9/02–20; E03B 2009/022; F16L 37/242; F16L 37/46; F16L 37/252; F16L 37/47; A62C 33/00; Y10T 137/7845; Y10T 137/7062; Y10T 137/7839; Y10T 137/9247; Y10T 137/7856; Y10T 137/5468; Y10T 137/87965; F16K 3/03

USPC ............ 137/272–308, 614–614.6, 798; 251/149–149.9; 285/73, 74, 360, 361, 285/376, 396, 401; 220/284, 285, 286, 220/85 P, 293, 298, 300, 301
See application file for complete search history.

(56) References Cited

U.S. PATENT DOCUMENTS

| | | | | |
|---|---|---|---|---|
| 154,087 | A * | 8/1874 | Roberts ............. | E03B 9/16 |
| | | | | 137/300 |
| 286,508 | A * | 10/1883 | Vadersen et al. ........ | E03B 9/02 |
| | | | | 137/302 |
| 1,020,917 | A * | 3/1912 | Linscott et al. ......... | E03B 9/06 |
| | | | | 137/299 |
| 1,164,077 | A | 12/1915 | Duey et al. | |
| 1,226,722 | A * | 5/1917 | Sullivan ............... | B65D 83/06 |
| | | | | 222/548 |

(Continued)

*Primary Examiner* — Craig J Price
(74) *Attorney, Agent, or Firm* — Stephen T. Scherrer; Monique A. Morneault; Scherrer Patent & Trademark Law, P.C.

(57) ABSTRACT

The present disclosure relates to coupling device and valve assembly for use with accessing the water flow in a fire hydrant. Specifically, the present disclosure relates to various coupling device and valve assemblies which are used as a quick connect and disconnect of a fire hose to the hydrant. Additionally, it is advantageous that the coupling device and valve assemblies also provide a self-sealing valve feature, which immediately stops the flow of water when the hose is disconnected from the hydrant. An advantage provided by the present coupling device and valve assemblies is that should a primary valve on a hydrant become unusable, the fire hose can be quickly disconnected from that hydrant and reconnected to a second hydrant without requiring a shutdown of the water grid feeding the disconnected hydrant.

6 Claims, 13 Drawing Sheets

(56) References Cited

U.S. PATENT DOCUMENTS

| | | | | |
|---|---|---|---|---|
| 1,580,312 | A | 4/1926 | Long | |
| 1,697,989 | A | 1/1929 | McWane | |
| 1,809,343 | A | 6/1931 | Angdon | |
| 2,275,477 | A * | 3/1942 | Sundholm | F16K 3/085 251/149.8 |
| 2,502,206 | A * | 3/1950 | Creek | F16L 41/08 251/149.1 |
| 2,945,703 | A | 7/1960 | Ballard | |
| 3,441,055 | A | 4/1969 | Pickell | |
| 3,446,403 | A * | 5/1969 | Serio | A47K 5/08 222/162 |
| 3,570,809 | A | 3/1971 | Stuy | |
| 3,939,861 | A | 2/1976 | Thompson | |
| 4,338,933 | A * | 7/1982 | Bayard | A61M 39/14 604/905 |
| 4,366,816 | A * | 1/1983 | Bayard | A61M 39/26 604/905 |
| 4,602,654 | A * | 7/1986 | Stehling | F16L 37/252 285/74 |
| 5,228,488 | A * | 7/1993 | Fletcher | B67C 11/04 222/548 |
| 5,641,012 | A | 6/1997 | Silversides | |
| 5,881,999 | A * | 3/1999 | Chen | F16K 3/085 251/352 |
| 5,937,920 | A * | 8/1999 | Simmel | B65B 1/06 141/354 |
| 5,947,171 | A * | 9/1999 | Woodruff | B65D 81/3211 141/354 |
| 5,975,491 | A | 11/1999 | Mann | |
| 6,050,309 | A * | 4/2000 | Woodruff | B67D 7/344 141/354 |
| 6,070,624 | A * | 6/2000 | Bilbrey | B67D 1/0829 222/548 |
| 6,102,444 | A * | 8/2000 | Kozey | F16L 37/252 285/376 |
| 6,447,027 | B1 * | 9/2002 | Lilley | F16L 37/113 285/376 |
| 6,450,542 | B1 * | 9/2002 | McCue | F16L 25/14 285/376 |
| 6,453,496 | B1 * | 9/2002 | Lee | G11B 23/505 15/1 |
| 6,694,783 | B2 * | 2/2004 | Trempala | F16L 55/1125 70/432 |
| 6,698,716 | B2 * | 3/2004 | Yang | F16K 31/52408 220/714 |
| 6,733,045 | B2 * | 5/2004 | Harrington | F16L 37/252 285/376 |
| 7,073,546 | B2 * | 7/2006 | Woodruff | B65D 47/265 141/351 |
| 7,128,901 | B2 * | 10/2006 | Jonas | A61K 8/892 424/68 |
| 7,387,320 | B2 * | 6/2008 | Kozey | F16L 55/1155 285/376 |
| 8,460,252 | B2 | 6/2013 | Stroup | |
| 9,895,562 | B2 * | 2/2018 | Richardson | F16L 35/00 |
| 10,458,561 | B1 * | 10/2019 | Engelsman | E03B 7/071 |
| 10,562,062 | B2 * | 2/2020 | Dobizl | B05C 11/1028 |
| 10,753,483 | B2 * | 8/2020 | Feiler | B65G 69/183 |

\* cited by examiner

COUPLING DEVICE AND SELF-SEALING VALVE ASSEMBLIES FOR CONNECTING AND DISCONNECTING A HOSE TO A FIRE HYDRANT

TECHNICAL FIELD

The present disclosure relates to various coupling devices and valve assemblies for use with accessing and controlling the water flow from a fire hydrant. Specifically, the present coupling devices are quick connect/disconnect devices for connecting and disconnecting a hose with a fire hydrant. The present coupling devices further include self-sealing valve assemblies for accessing the water flow when the hose is connected to the hydrant, and for sealing off the water flow from the hydrant when the hose is disconnected. The present coupling devices and self-sealing valve assemblies enable the user to connect a hose to a hydrant to access the water, as well as seal off the water flow after disconnecting the hose from the hydrant without requiring a complete shutdown of the water system.

BACKGROUND

Fire hydrants are an essential tool in effective firefighting. A fire hydrant is the connection point at which firefighters can easily and quickly tap into a direct water supply. Before the well-known above ground fire hydrants seen today, water had to be brought to the fire scene using human chain "bucket brigades" or with horse-drawn fire pump wagons. Fire hydrants stationed at multiple locations provide an instant source of water and changed the manner and effectiveness of modern firefighting.

To access the water in the hydrant, the firefighter releases a hydrant nozzle, attaches a hose to the fire hydrant nozzle g a threaded connection and then opens a valve: on the hydrant. Opening the valve pro des a powerful flow of eater under pressure. The amount of water pressure varies according to region and may also depend on various factors including the size and location of the water main attached to the hydrant. The firefighter can then attach the hose to a fire engine, using a powerful pump to boost the water pressure and potentially split the water into multiple streams for more effective fire suppression.

Having quick access to a fire hydrant can be critical for effective firefighting. Additionally, the ability to quickly connect and disconnect from the fire hydrant is also important. If during a fire incident, a particular hydrant becomes inoperable, a quick disconnect of the fire hose from that particular hydrant, and connection to a second hydrant, may mean the difference between saving and losing a structure. However, in some instances, disconnection from a particular hydrant requires that the entire water supply system, or the main water supply, be shutdown to regain control of the hydrant.

Therefore, a need exists for a coupling device and valve assembly for use with a fire hydrant, wherein the detachable coupling device provides a quick connect and disconnect of a hose to the hydrant. Additionally, it is advantageous that the coupling device and valve assembly also provides a self-sealing feature for the hydrant, which stops the flow of water when the hose is disconnected from the hydrant. An advantage provided by the present coupling device and valve assemblies is that should a primary valve on a hydrant become unusable, the fire hose can be quickly disconnected from that hydrant and reconnected to a second hydrant without requiring a shutdown of the water supply system feeding the hydrant.

Moreover, a need exists for an improved coupling device and valve assembly for use with a hydrant. Specifically, a need exists for a self-sealing valve assembly, wherein when the hose is disconnected from the hydrant, the valve assembly self-seals the hydrant stopping the water flow from the disconnected hydrant.

Additionally, a need exists for an improved coupling device and valve assembly which enables faster and more flexible hose deployment, such that the operator can quickly disconnect from one hydrant and connect to another hydrant, without needing to shut down the entire water supply system.

SUMMARY

The present disclosure relates to an improved coupling devices and valve assemblies for accessing the water flow of a fire hydrant. Specifically, the present disclosure relates to a detachable coupling device for use with a fire hydrant, wherein the coupling device provides a quick connect and disconnect of a hose to the hydrant. Additionally, the detachable coupling device also includes a self-sealing valve assembly, which stops the flow of water from the hydrant when the hose is disconnected from the hydrant.

The present detachable coupling devices and valve assemblies provide numerous advantages. For example, should a primary valve on a hydrant become unusable, the present coupling device allows the fire hose to be quickly disconnected from that hydrant and reconnected to a second hydrant without requiring a shutdown of the main water grid feeding the hydrant. The present coupling devices also provide advantages over standard threaded couplers. For example, the present detachable coupling device permits a team of firefighters to rapidly change location from one hydrant to the next, because the coupling device can disconnect the hose without requiring turning off the hydrant valve. Additionally, in the event of a failure or loss of control of a hydrant's main valve, the present coupling device and valve assembly provides a shutoff redundancy. This is critical as this type of failure event typically requires shutting off the grid valve of the main water supply to recover the valve or even move the hose.

To this end, in an embodiment of the present disclosure, a detachable coupling device for connecting and disconnecting a hose from a hydrant is provided. A detachable coupling device comprises a male component, a female component positioned within a receiver of the fire hydrant and configured for engagement with the male component and, a valve assembly, wherein the valve assembly is configured to control a flow of water from the fire hydrant when the male component engages the female component.

In another embodiment, a detachable coupling and valve assembly device for connecting and disconnecting a hose to a fire hydrant is provided. The device comprises a male component, a female component positioned within a receiver of the fire hydrant and configured for engagement with the male component, and, a self-sealing valve assembly comprising a water flow control element and a valve interface element, wherein the valve interface element is configured for engagement with the water flow control element to control a flow of water from the fire hydrant when the male component engages the female component.

Generally, the male component affixes the hose to the hydrant, while the female component, which is installed into a standard fire hydrant, houses a sealing valve element of the valve assembly. Additionally, the coupling device utilizes a partial turn locking mechanism to accomplish the quick connect functionality of the device. The locking mechanism simultaneously actuates the sealing valve element within the female component. The locking mechanism uses pins on the male component of the coupling device to connect with slots in the female component to mechanically fix the parts together as well as to accomplish the correct motion for valve actuation.

In one embodiment, a coupling device is provided incorporating a shutter valve assembly. The shutter valve assembly includes two concentric circular plates with corresponding section cutouts. These plates are housed in the female component of the coupling device. When the male component of the coupling device interfaces with the female component, i.e., the hose is attached to the hydrant, the user turns the male component, which engages the locking mechanism as well as the valve plate. As the user rotates the locking mechanism into the fully locked position, the valve plate rotates such that the cutout sections of the plates align and allow for fluid passage. As the user removes the male component, the plates are rotated in the opposition direction effectively closing the valve and shutting off the water flow. The male component is then unlocked from the female component, and the hose can be disconnected from the hydrant.

In a further embodiment, a coupling device is provided incorporating a key valve assembly. The key valve assembly uses a cylindrical tumbler housed within the female component of the coupling device. The tumbler includes key slots formed within the walls of the tumbler, which correspond to key slots in the interior surface of the female component. As the male component connects with the female component, i.e., the hose is attached to the hydrant, the male component simultaneously engages and rotates the tumbler thereby aligning the tumbler key slots with the key slots of the female component, thereby permitting the flow of water from the hydrant. Conversely, when the male component is rotated in the opposite direction, the respective key slot openings of the tumbler and female component are no longer aligned, effectively closing the flow of water from the hydrant.

In yet another embodiment, a coupling device is provided incorporating a plunger valve assembly. In this embodiment, the coupling device comprises a male component as a hose adapter for attachment to a hose and a female component housing a spring-loaded plunger mechanism. The male component hose adapter engages with the spring-loaded plunger mechanism within the female component, and when the hose adapter is rotated, a mating surface on the male component interfaces with the plunger and compresses the spring. The plunger releases from an opening in the hydrant allowing water to flow from the hydrant. When the male component hose adapter is rotated back, the plunger mechanism is pushed back into a locking position, sealing the opening in the hydrant and stopping the flow of water.

It is, therefore, an advantage and objective of the present disclosure to provide a detachable coupling device and valve assembly for use with connecting and disconnecting a hose to a fire hydrant quickly and easily.

It is further an advantage of the present disclosure to provide a detachable coupling device and valve assembly for quickly connecting and disconnecting a hose to a fire hydrant, wherein the water flow from the hydrant is quickly and easily released from the hydrant using the coupling device and valve assembly when the hose is connected to the hydrant.

It is yet a further advantage of the present disclosure to provide a detachable coupling device and valve assembly for quickly and effectively connecting and disconnecting a hose to a fire hydrant, wherein the water flow from the hydrant is immediately stopped when the hose is disconnected from the hydrant.

It is yet another advantage of the present disclosure to provide a valve assembly that is self-sealing to immediately stop the flow of water when the hose is detached from the hydrant.

Additional features and advantages of the present disclosure are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The present disclosure relates to an improved detachable coupling device and valve assembly for accessing and controlling the water flow of a fire hydrant. Specifically, the present disclosure relates to a coupling device assembly for use with a fire hydrant, wherein the coupling device assembly provides a quick connect and disconnect of a hose to the hydrant. Additionally, it is advantageous that the detachable coupling device incorporates a self-sealing valve assembly, which not only permits access to the water from the hydrant, but also immediately stops the flow of water when the hose is disconnected from the hydrant.

An advantage provided by the present coupling device and valve assembly is that should a primary valve on a hydrant become unusable, the fire hose can be quickly disconnected from that hydrant, which also immediately stops the flow of water from the hydrant and reconnected to a second hydrant without requiring a shutdown of the water grid feeding the initial hydrant. The unique features of the coupling device and valve assemblies of the present disclosure are be effective for maintaining a constant flow of water during a firefighting event.

Now referring to the figures, wherein like numerals refer to like parts, FIGS. 1-13B illustrate embodiments of coupling devices and valve assemblies, which are useful for connecting a hose to a hydrant and for controlling the flow of water from the hydrant. FIGS. 1-5B illustrates a coupling device incorporating a shutter valve assembly 10; FIGS. 6-9B illustrate a coupling device incorporating a key valve assembly 100; and FIGS. 10-13B illustrate a coupling device incorporating a plunger valve assembly 200. Details of each coupling device and valve assembly will be presented below. All embodiments of the present coupling devices and valve assemblies are designed to quickly connect and disconnect a fire hose (not shown) to a hydrant 50. Additionally, each coupling device and valve assembly is designed to provide a quick shutoff of the water flow from the hydrant when the hose is disconnected from the hydrant.

Each embodiment of the detachable coupling device and valve assembly 10, 100 and 200 provided herein includes a female component 12, 112, 212 and a male component 14, 114, 214 which engage together to form the coupling device. The female and male components may also be referred to as "female housing" and "male housing," respectively. The female component is configured for attachment to or seating within the fire hydrant, specifically into a receiver section, which is the opening where the water flows from the hydrant.

The male component is designed for connecting a firehose (not shown) to the hydrant 50, and for engagement with the female component. In certain embodiments, coordinating components of the various valve assemblies are located within both the female component and the male component. For example, the sealing element of the valve assembly is in the female component, while the complimentary coupler element is in the male component. When the male component engages with the female component, the sealing element is coupled with the coupler element, which activates the valve assembly and controls the flow of water from the hydrant.

The male component also includes at least one handle 15 and preferably two opposing handles, positioned on the outer circumference or outer surface of the male component. The opposing handles are easily grasped to rotate the male component in a first direction to rotatably engage the male component to the female component, and effectively attaching the hose to the hydrant. The rotatable engagement of the two components also activates the specific valve assembly to release the flow of water from the hydrant. Additionally, the male component is rotatable in an opposite second direction to activate the valve assembly to close the flow of water from the hydrant prior to removal of the hose.

Figure 1:
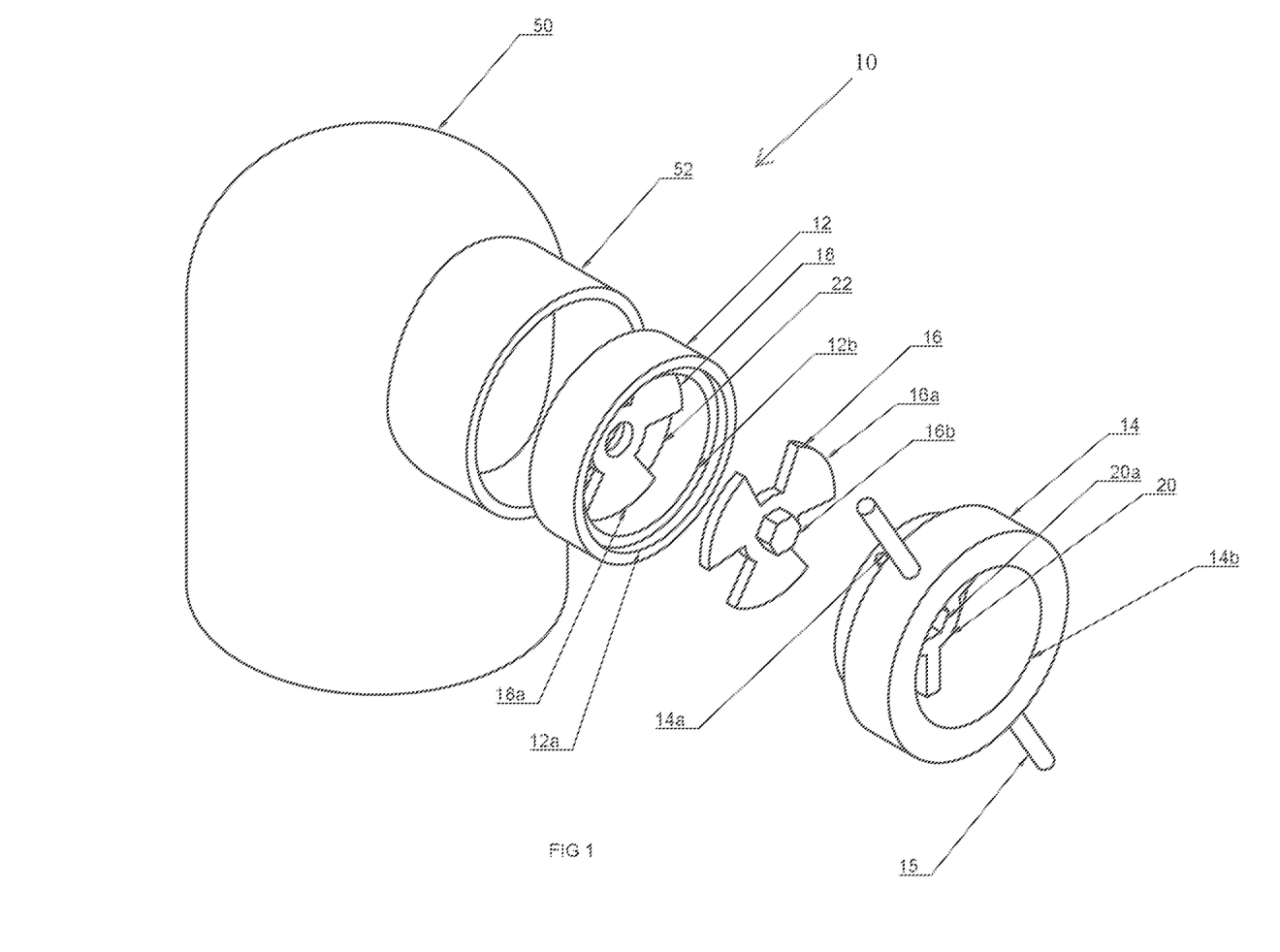
FIG. 1 illustrates an exploded view of an embodiment of a coupling device incorporating a shutter valve assembly according to the present disclosure.
Figures 2A, 2B, 2C:
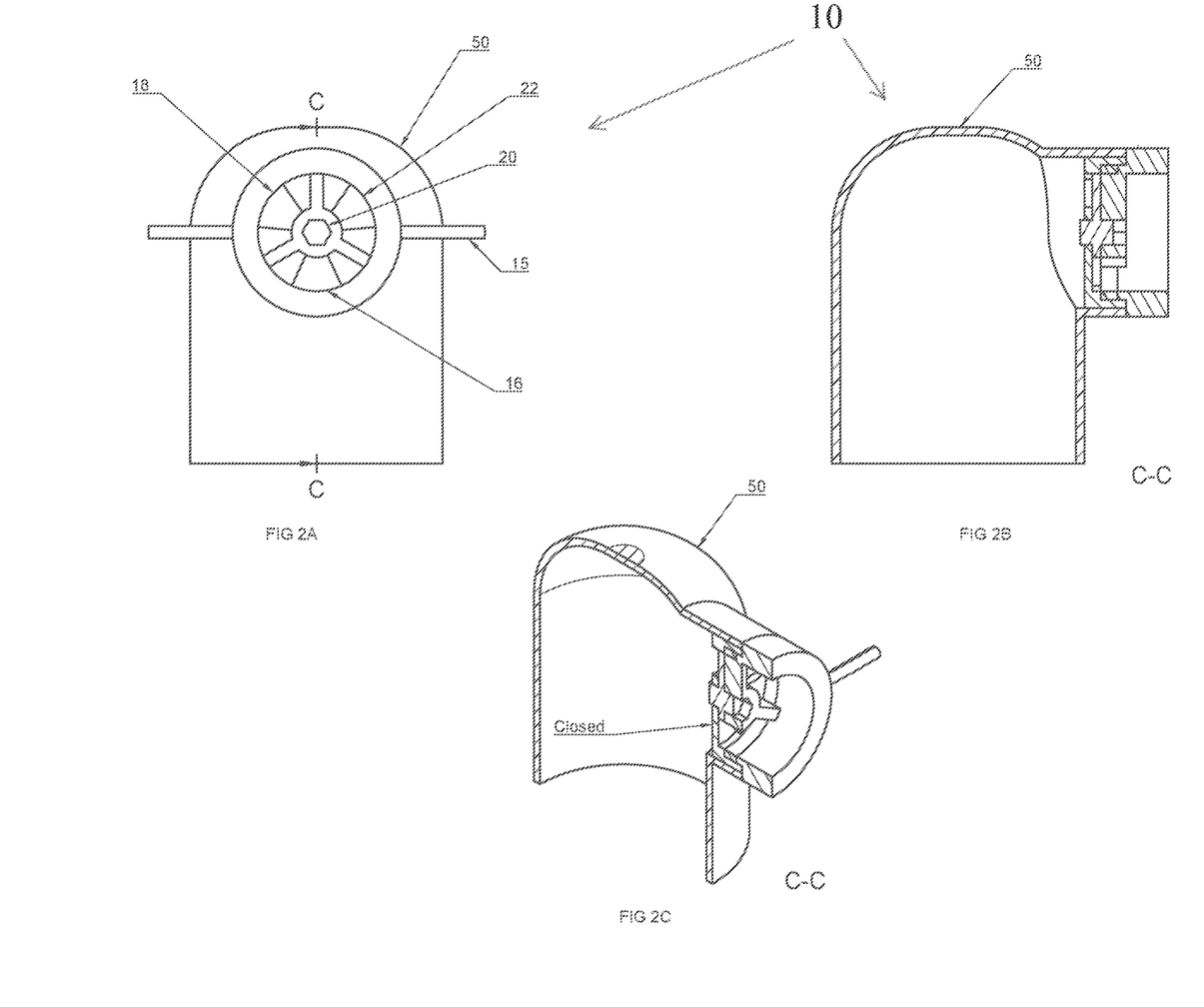
FIG. 2A illustrates a front view of the coupling device and shutter valve assembly in the closed position.
FIGS. 2B and 2C illustrate a cut-away view of the coupling device and shutter valve assembly of FIG. 2A.
Figure 3A:
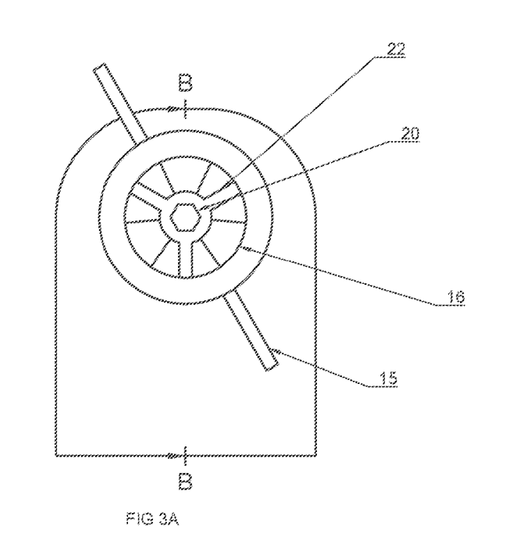
FIG. 3A illustrates a front view of the coupling device and shutter valve assembly in the open position.
Figure 3B:
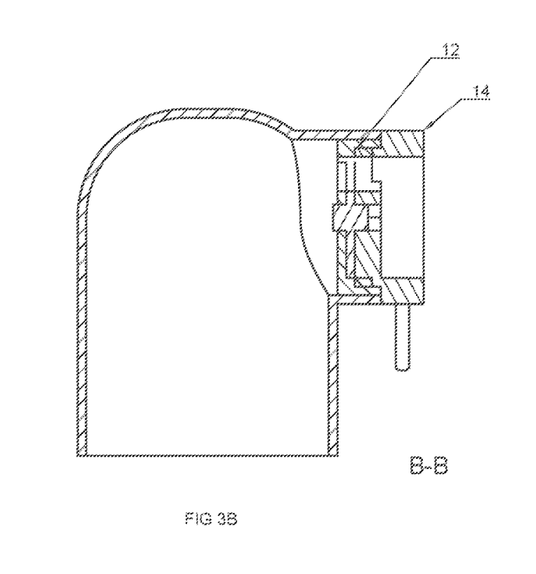
FIGS. 3B and 3C illustrate a cut-away view of the coupling device and shutter valve assembly of FIG. 3A.
Figure 3C:
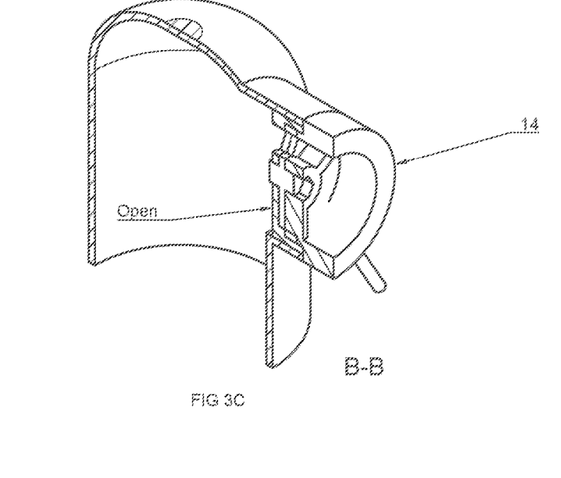
Figure 4A:
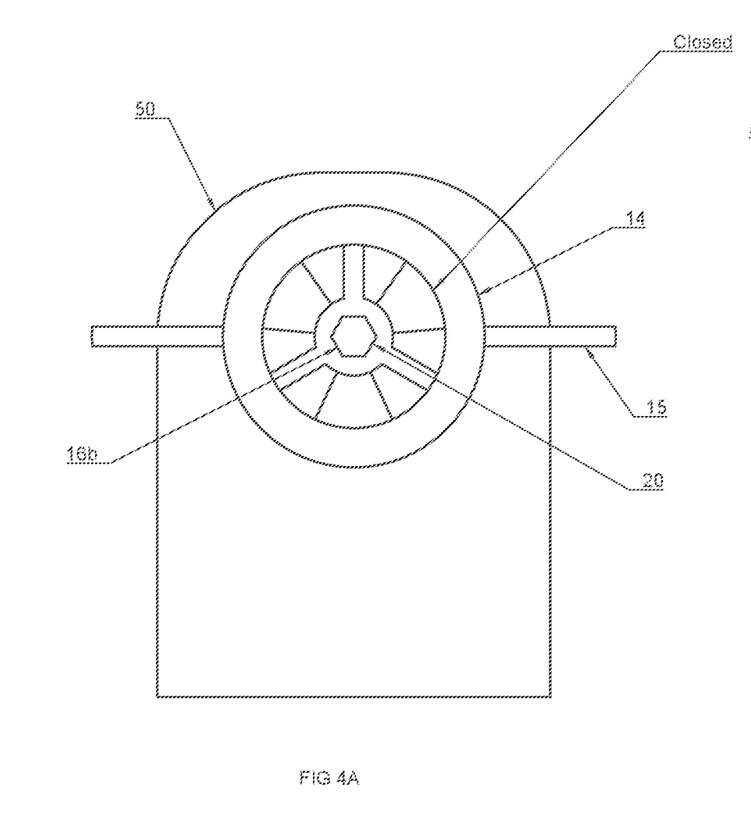
FIG. 4A illustrates a front view of the coupling device and shutter valve assembly in the closed position.
Figure 4B:
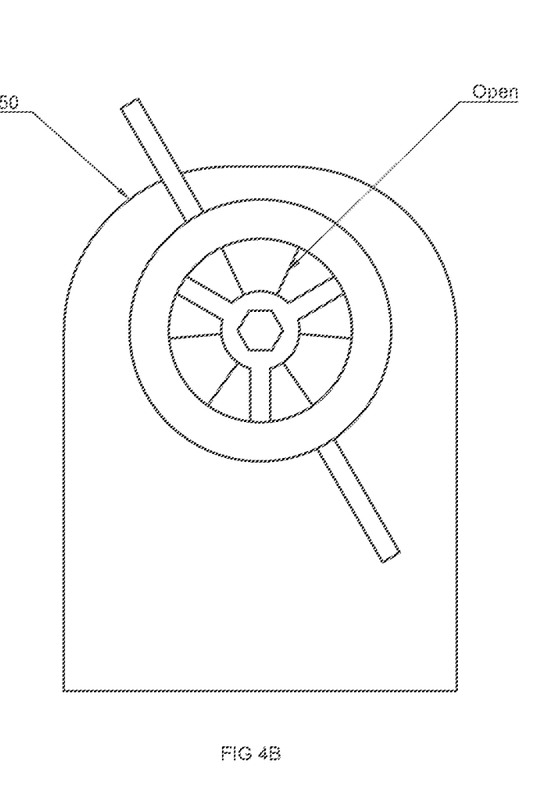
FIG. 4B illustrates a front view of the coupling device and shutter valve assembly in the open position.
Figure 5A:
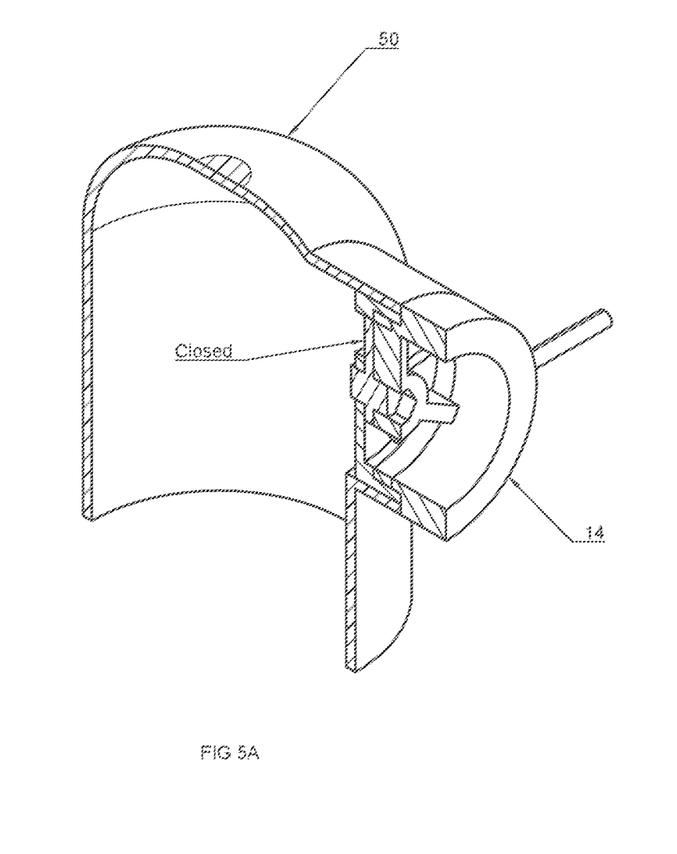
FIG. 5A illustrates a cut-away view of the coupling device and shutter valve assembly in the closed position.
Figure 5B:
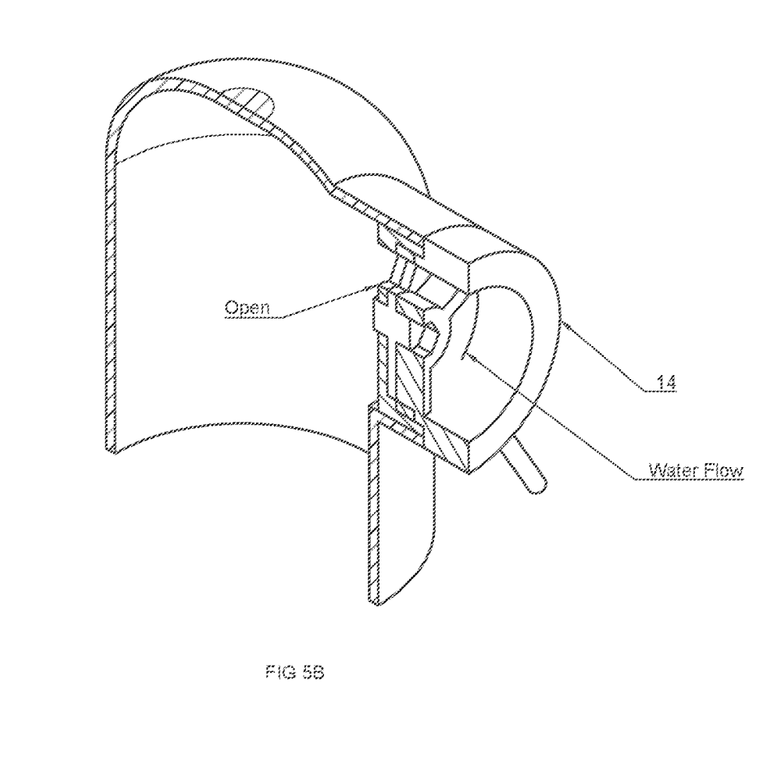
FIG. 5B illustrates a cut-away view of the coupling device and shutter valve assembly in the open position.

The female component and the male component engage together through a partial turn locking mechanism, which accomplishes the quick connect functionality feature of the present disclosure. The partial turn simultaneously actuates the valve assemblies, which will be described. In an embodiment, the locking mechanism uses pins 14a on the male component 14, which engage with slots 12a in the female component 12 to mechanically join the components together as well as to accomplish the correct motion for valve actuation (FIG. 1). It should be understood, however, that other forms of locking mechanisms may be incorporated into the present coupling device assemblies.

FIGS. 1-5B illustrate a first embodiment of a detachable coupling device incorporating a shutter valve assembly 10. As shown in FIG. 1, the coupling device and shutter valve assembly 10 includes a female component 12 and a male component 14, which together construct the coupling device. The female component 12 is configured for seating within a receiver 52, which is an opening or outlet for the water flow from the hydrant 50. In this embodiment, the female component 12 houses two rotating shutter plates, which are parts of the shutter valve assembly. The two rotating shutter plates, a first shutter plate 16 and a second shutter plate 18, are seated in spaced, parallel arrangement to one another within the interior space 12b of the female component 12. The rotating shutter plates 16, 18 have generally a fan or rotor shape. In the present embodiment, the shutter plates have three arms 16a or extensions around a center nut 16b; however, it should be understood that the shutter plates can have any number of arms or extensions forming the overall fan shape.

As shown in FIGS. 2A through 2C and FIGS. 4A and 5A, and until the hydrant is needed, the first shutter plate 16 and second shutter plate 18 overlap such that the arms 16a, 18a of each plate close off the flow of water from the hydrant. In operation, when a hose (not shown) is attached to the hydrant through the male component 14, the user rotates the male component using the outer handles 15 to secure the male component with the female component 12. The male component 14 includes a valve interface element 20 located within the interior space 14b of the male component. When the male component 14 is secured to the female component 12, the valve interface element 20 includes a center opening 20a, which engages with the center nut 16b of the first shutter plate 16.

The rotation of the male component also rotates the first shutter plate 16 within the female component 12. Rotation of the shutter plate 16 exposes an opening or fluid passage 22 or multiple openings or fluid passages between the arms 16a of the first shutter plate and the arms 18a of the second shutter plate 18. This motion and configuration of the shutter plates and arms effectively releases the flow of water from the hydrant 50, such that water flows from the hydrant through the openings 22 between the arms of the first and second shutter plates (FIGS. 3A through 3C, FIGS. 4B and 5B) and into the waiting hose.

Figure 6:
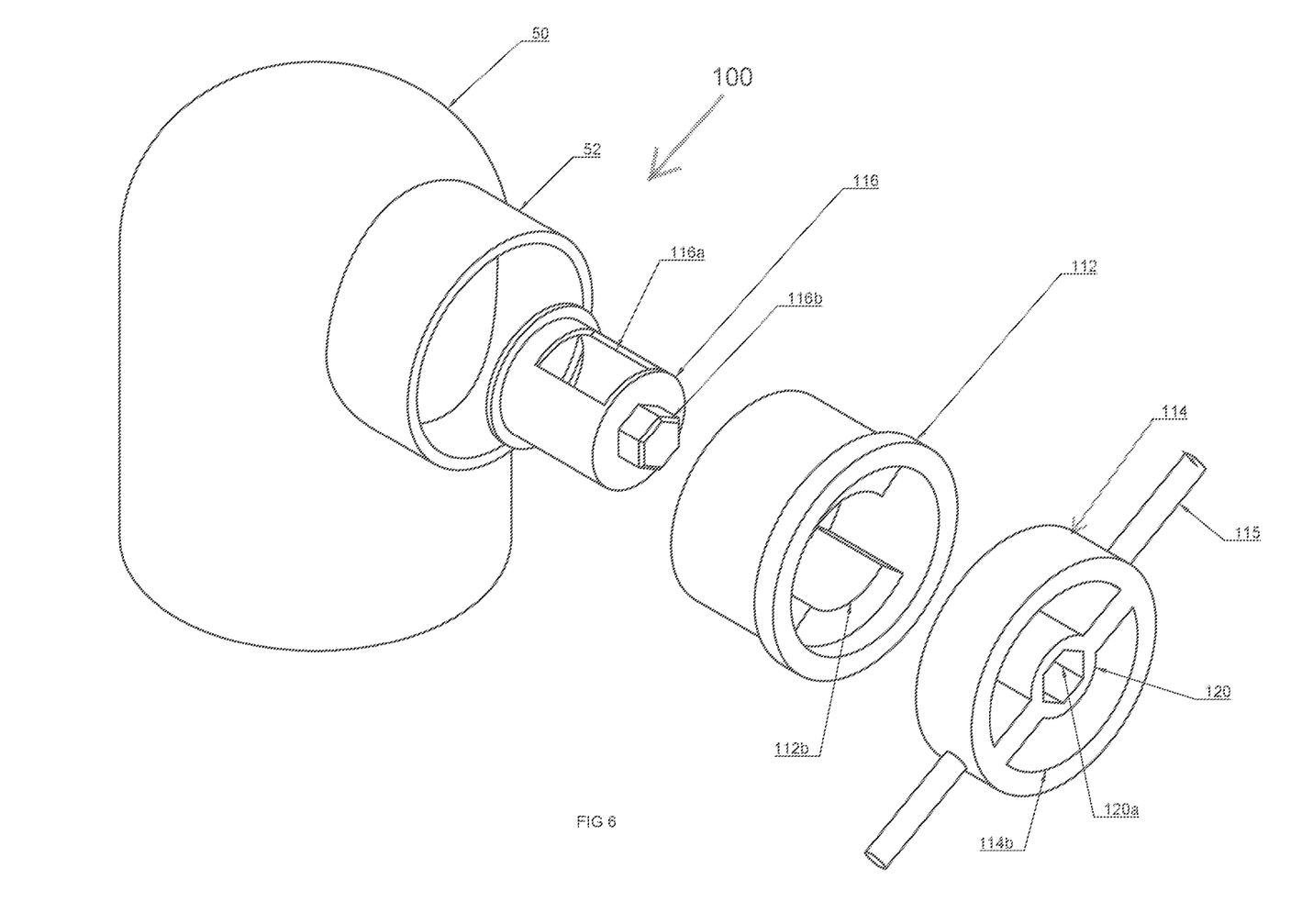
FIG. 6 illustrates an exploded view of an embodiment of a coupling device incorporating a key valve assembly according to the present disclosure.
Figure 7A:
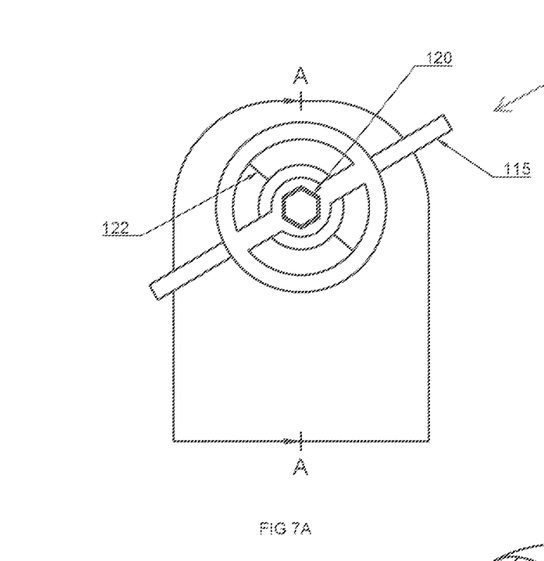
FIG. 7A illustrates a front view of the coupling device and key valve assembly in the closed position.
Figure 7B:
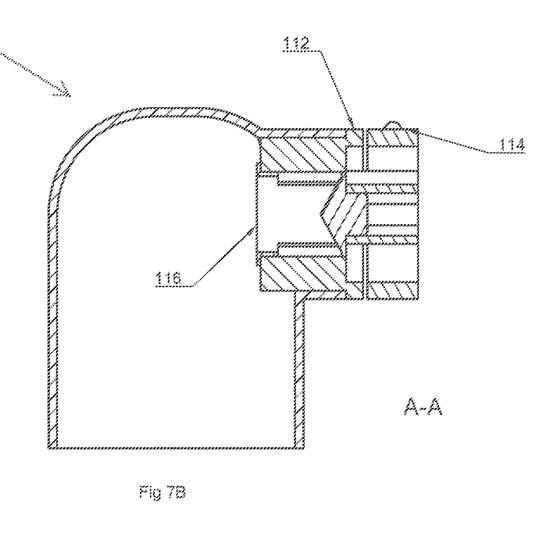
FIGS. 7B and 7C illustrate a cut-away view of the coupling device and key valve assembly of FIG. 6A.
Figure 7C:
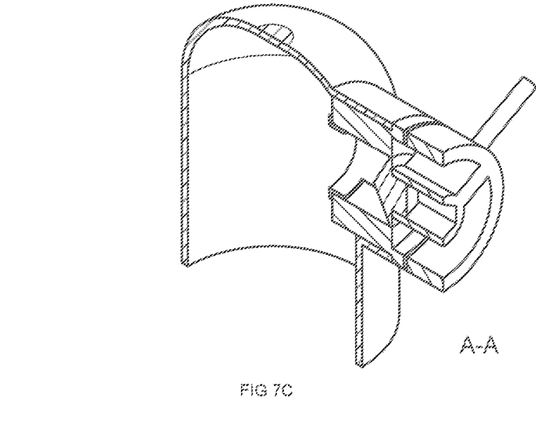
Figure 8A:
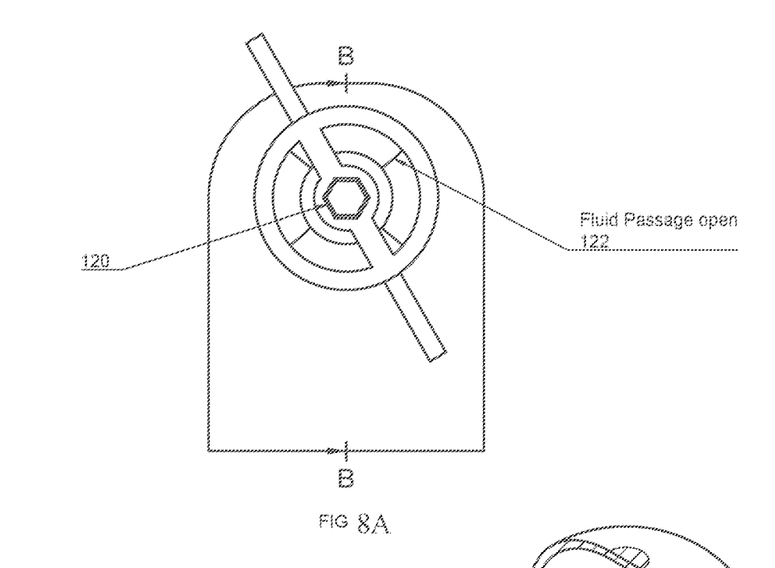
FIG. 8A illustrates a front view of the coupling device and key valve assembly in the open position.
Figure 8B:
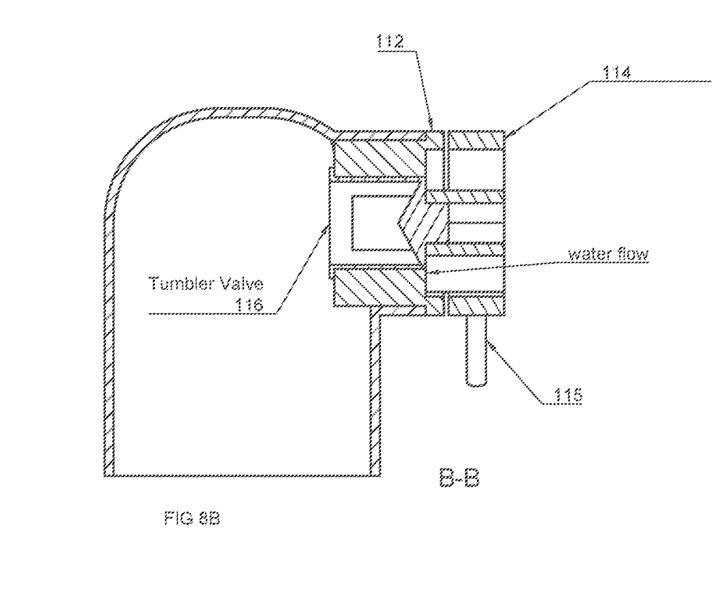
FIGS. 8B and 8C illustrate a cut-away view of the coupling device and key valve assembly of FIG. 8A.
Figure 8C:
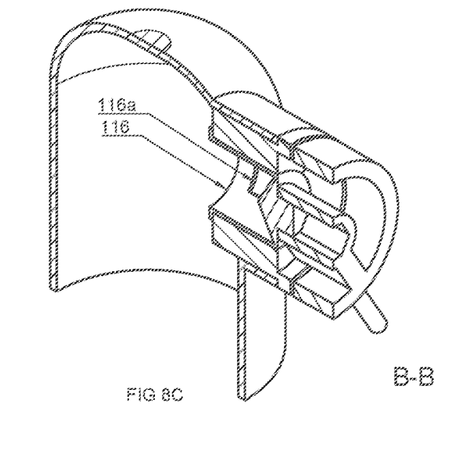
Figure 9A:
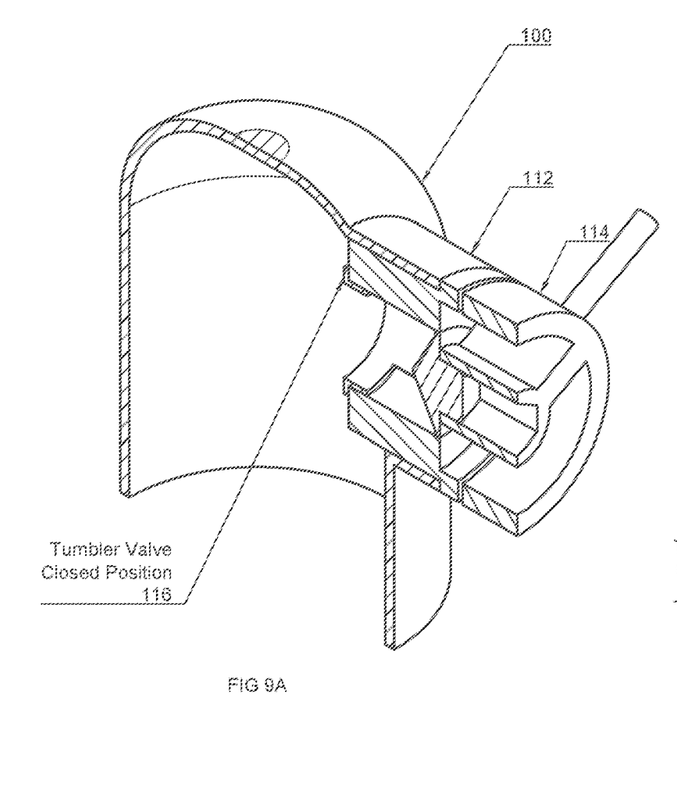
FIG. 9A illustrates a cut-away view of the coupling device and key valve assembly in the closed position.
Figure 9B:
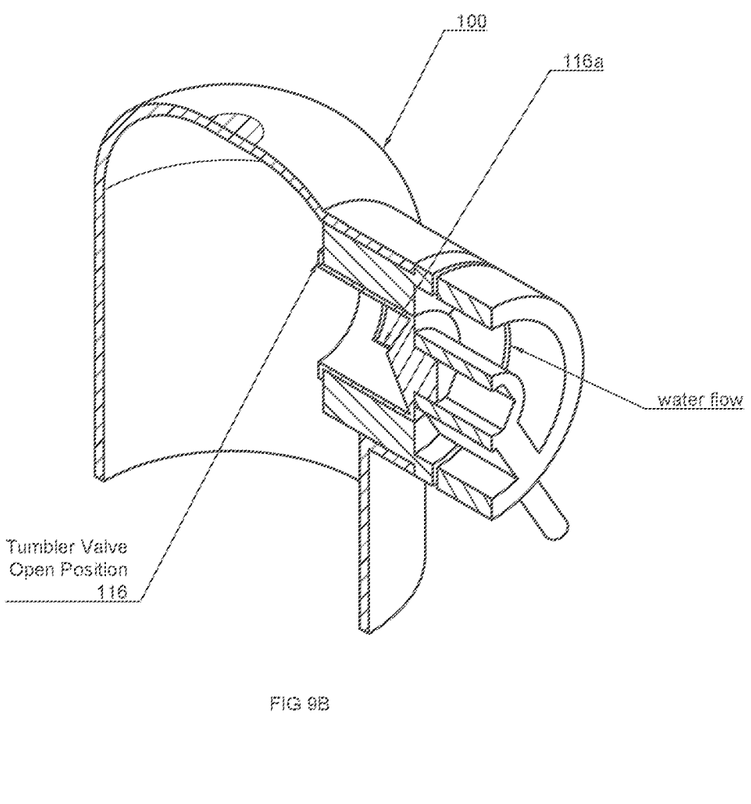
FIG. 9B illustrates a cut-away view of the coupling device and key valve assembly in the open position.

FIGS. 6-9B illustrate another embodiment of a coupling device assembly incorporating a key valve assembly 100. As shown in FIG. 6, the couple device and key valve assembly 100 includes a female component 112 and a male component 114. The female component 112 is configured for seating within a receiver 52 of the hydrant 50, which is opening or outlet where the flow of water exits the hydrant.

In this embodiment, the female component houses a cylindrical tumbler valve 116, which includes an opening 116a or key valve in a side of the valve. The tumbler valve 116 further includes a nut 116b centered on an end of the valve. The tumbler valve 116 is seated within the interior space 112b of the female component 112.

The male component 114 houses a valve interface element 120 located within the interior space 114b of the male component. The valve interface element 120 includes a center opening 120a designed for engagement with the center nut 116b of the tumbler valve 116, when the male component 114 engages the female component 112.

As shown in FIGS. 7A through 7C and FIG. 9A, and until the hydrant is needed, the tumbler valve 116 is rotated such that the opening or key valve 116a is positioned against the interior 112b of the female component, thereby closing off the flow of water from the hydrant. In operation, when a hose (not shown) is attached to the male component 114, the user rotates the male component using the outer handles 115. The rotation engages the center opening 120a of the valve interface element 120 with the nut 116a on the center of the cylindrical tumbler valve 116, thereby rotating the opening 116a into alignment to permit water flow from the hydrant. The rotation and configuration of the tumbler valve 116 effectively releases the flow of water from the hydrant 50, directing the water flow through the open or key valve 116a and out through the attached hose (not shown) (FIGS. 8A through 8C, FIG. 9B).

Figure 10:
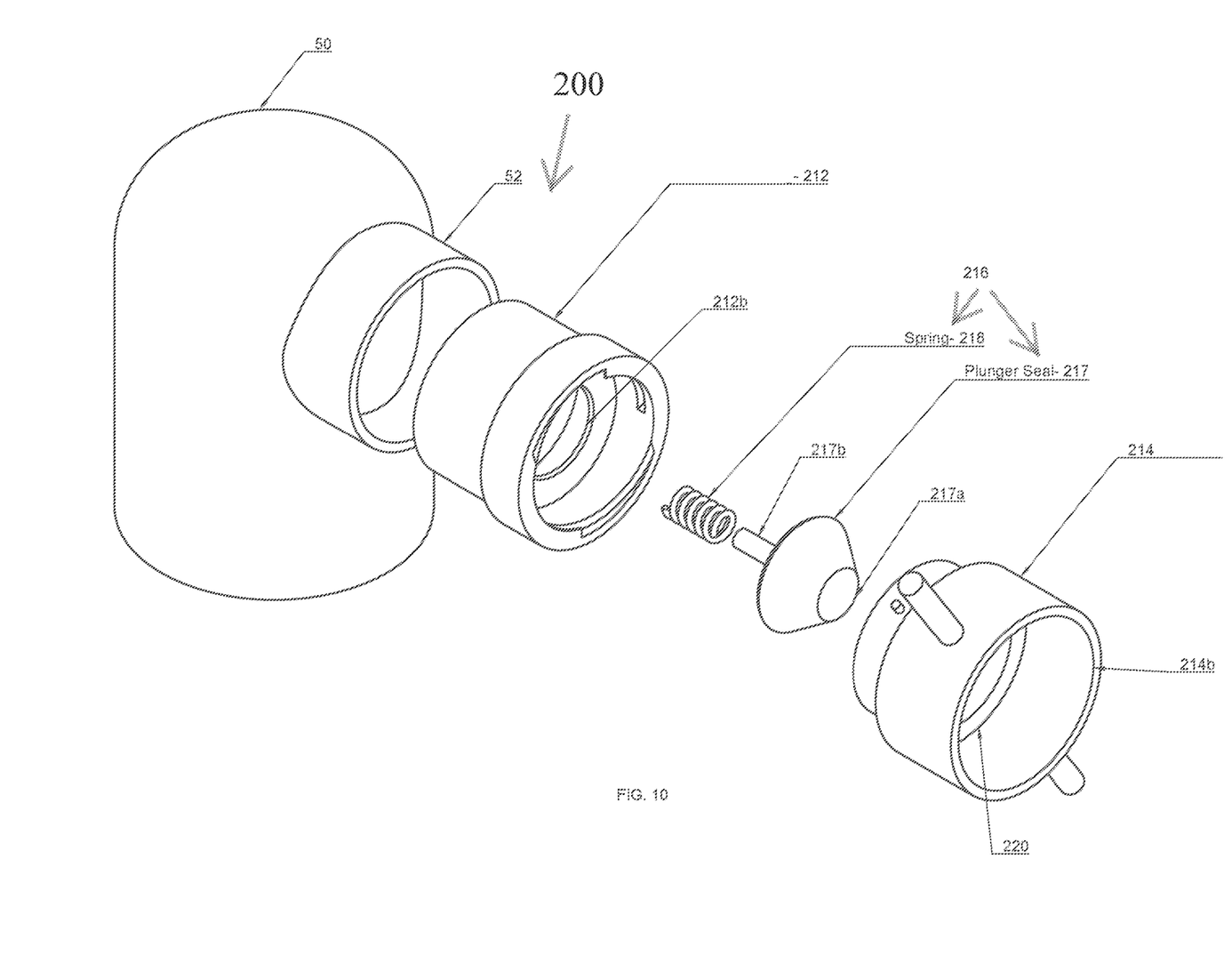
FIG. 10 illustrates an exploded view of an embodiment of a coupling device incorporating a plunger valve assembly according to the present disclosure.

FIGS. 10-13B illustrate yet another embodiment of a coupling device incorporating a plunger valve assembly 200. As shown in FIG. 10, the coupling device and plunger valve assembly 200 includes a female component 212 and a male component 214. As with previous embodiments, the female component 212 is configured for seating within a receiver 52 of the hydrant 50, which is where the flow of water exits the hydrant.

Figure 11A:
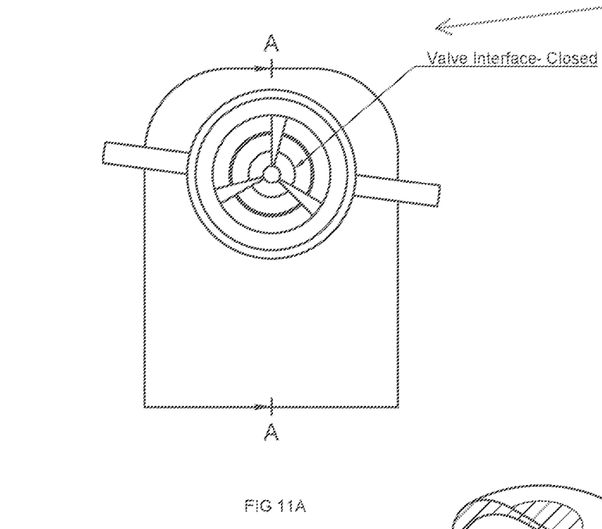
FIG. 11A illustrates a front view of the coupling device and plunger valve assembly in the closed position.
Figure 11B:
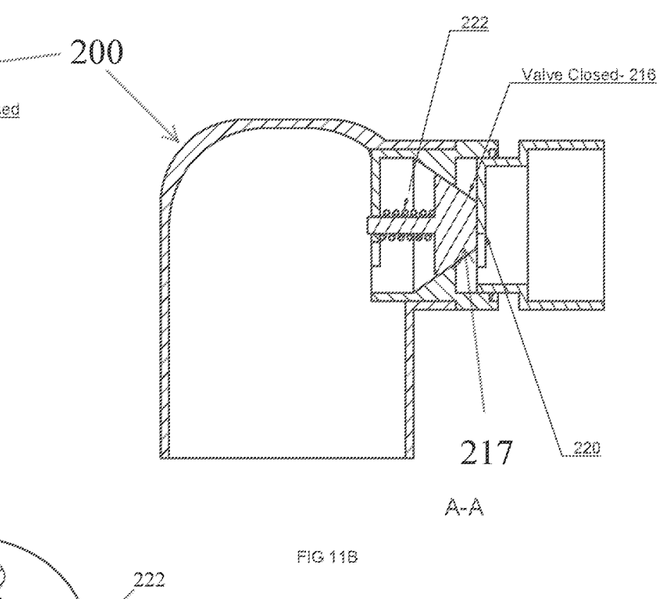
FIGS. 11B and 11C illustrate a cut-away view of the coupling device and plunger valve assembly of FIG. 11A.
Figure 11C:
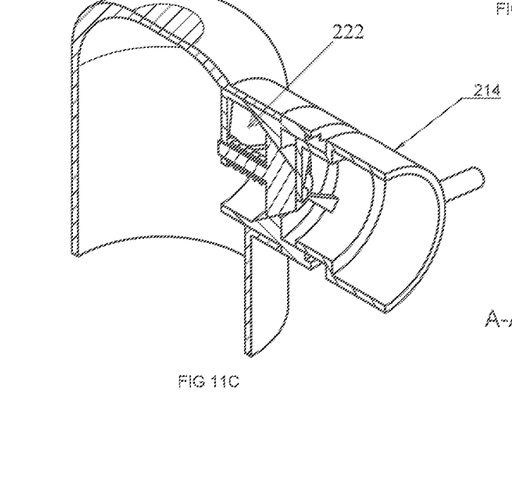
Figures 12A, 12B, 12C:
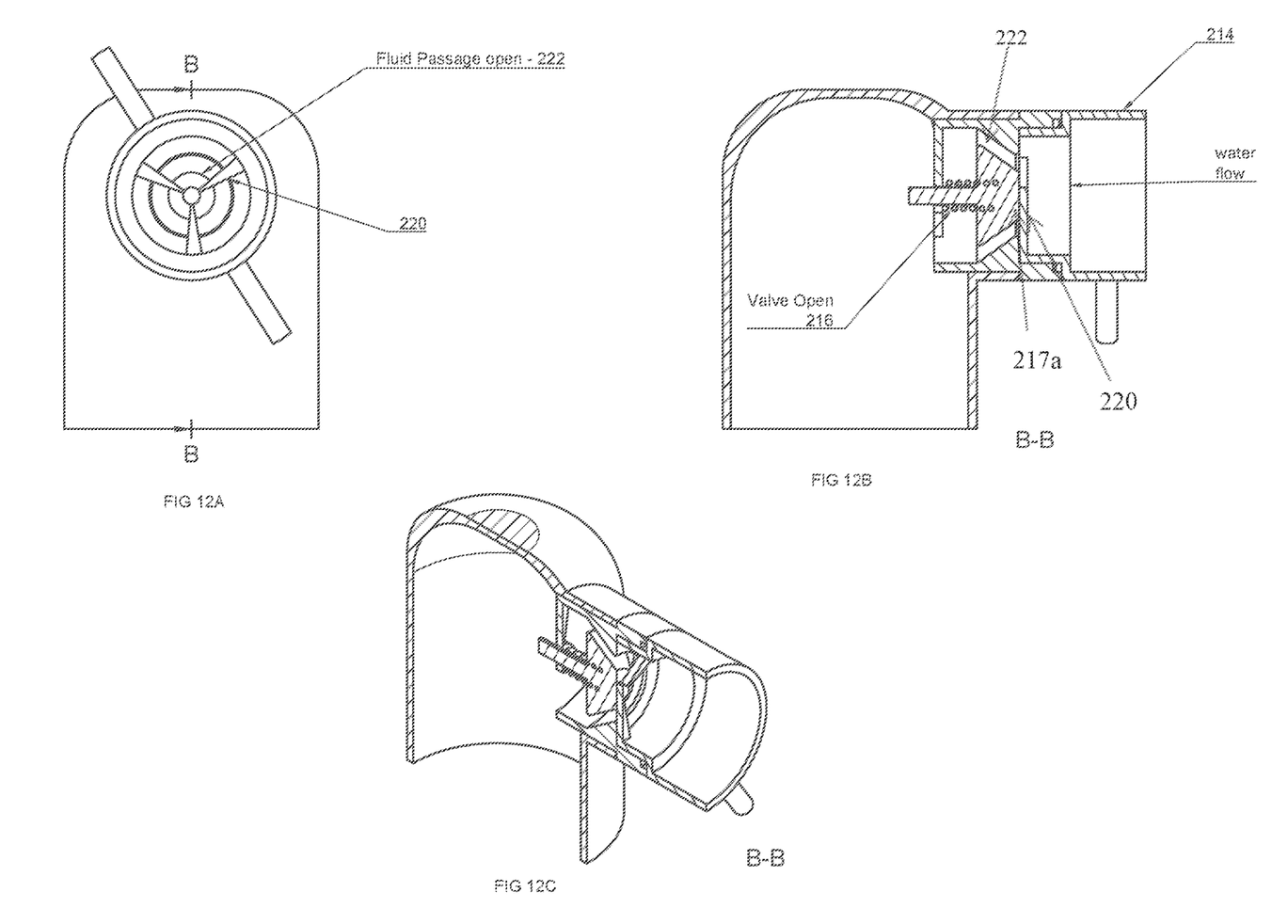
FIG. 12A illustrates a front view of the coupling device and plunger valve assembly in the open position.
FIGS. 12B and 12C illustrate a cut-away view of the coupling device and plunger valve assembly of FIG. 12A.

In this embodiment, the female component 212 houses a plunger valve assembly 216, which comprises a plunger seal 217 and a spring 218. The plunger seal 217 has a cone-shape configuration, with a flat top 217a and opposing stem 217b extending from a bottom end of the plunger. The plunger seal 217 is designed to sit snug within an opening 222 to the hydrant. The spring 218 is configured to wrap around the stem 217b of the plunger seal (FIGS. 11B and 11C). As will be described, the spring 218 is designed to actuate the plunger seal 217 between an open and a closed position.

The male component 214 includes a valve interface mating surface 220 located within the interior space 214b of the male component. The valve interface mating surface 220 contacts the top 217a of the plunger 217 when the male component 214 is locked onto the female component 212 in the rotational manner previously described, which thereby opens and closes the flow of water from the hydrant.

Figure 13A:
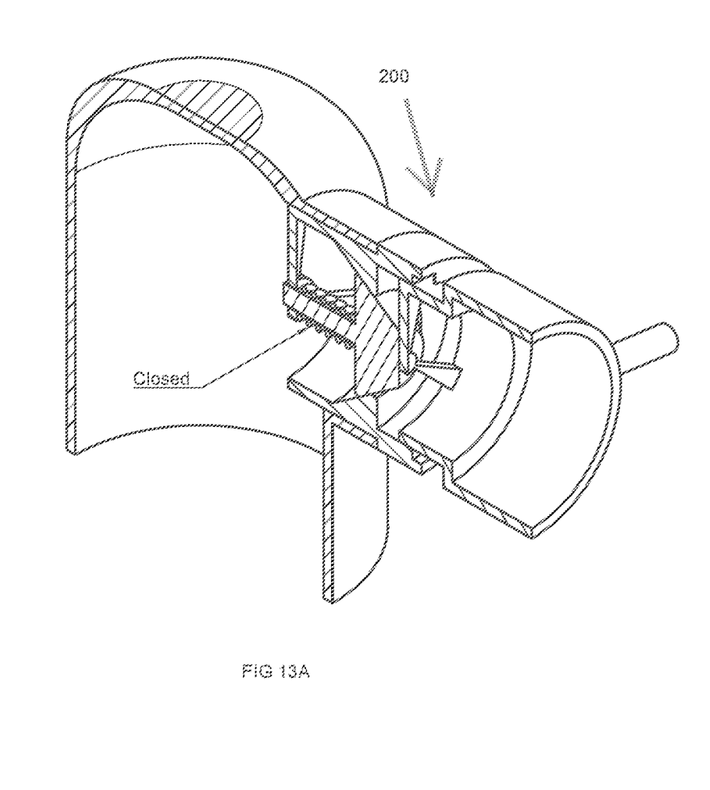
FIG. 13A illustrates a cut-away view of the coupling device and plunger valve assembly in the closed position; and, FIG. 13B illustrates a cut-away view of the coupling device and plunger valve assembly in the open position.
Figure 13B:
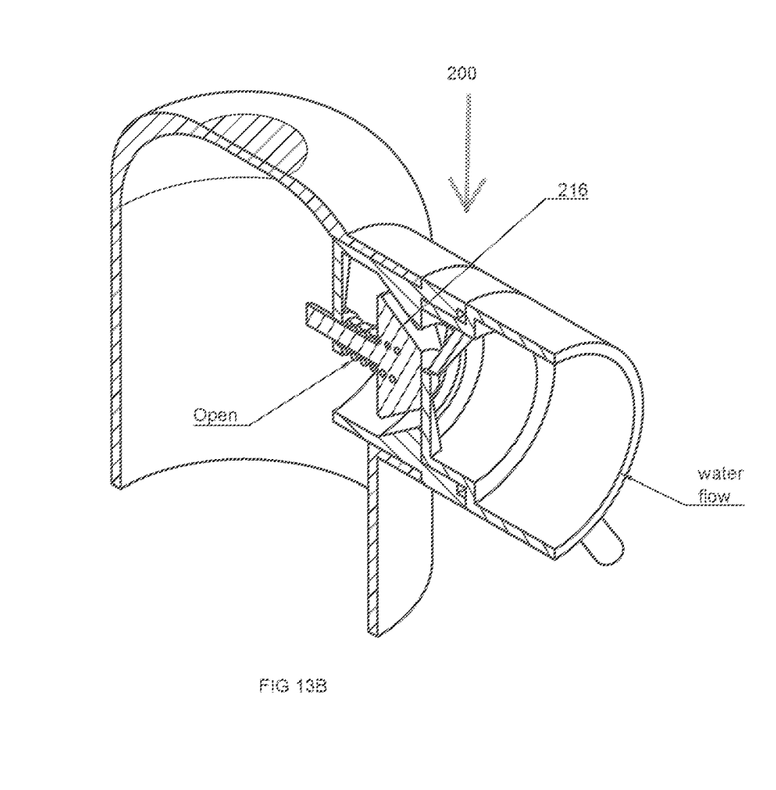

As shown in FIGS. 11A through 11C and FIG. 13A, and until the hydrant is needed, the plunger valve assembly 216 is positioned such that the spring 218 is in a relaxed, extended, effecting the plunger seal 217 to close off the water flow opening 222 within the hydrant. In operation, when a hose (not shown) is attached to the male component 214, the user rotates the male component using the outer handles 215, which engages the male component with the female component 212 and the hydrant. The rotation of the male component 214 also moves the valve interface mating surface 220 into contact with the top end 217a of the plunger seal 217, thereby moving the plunger axially against and compressing the spring 218. This axial motion of the plunger 217 against the spring 218 moves the plunger seal away from the opening 222 within the hydrant, releasing the flow of water from the hydrant 50 and out to the hose (FIGS. 12A through 12C, FIG. 13B). When the male component 214 is rotated to remove the hose from the hydrant, the inward pressure is released on the spring 218, and the plunger seal 217 is moved back into the hydrant opening 222, thereby sealing the opening and stopping the flow of water from the hydrant (FIG. 13A).

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A detachable coupling device for connecting and disconnecting a hose to a fire hydrant, the device comprising:
   a male component;
   a female component positioned within a receiver of the fire hydrant and configured for engagement with the male component; and,
   a valve assembly within an interior space of the female component, the valve assembly comprising a first shutter plate overlapping a second shutter plate,
      wherein the valve assembly is configured to control water flow from the fire hydrant when the male component engages the female component activating the valve assembly, and
      wherein the valve assembly further comprises a valve interface element for engaging a center nut of the first shutter plate, wherein the first shutter plate is rotatable in relation to the second shutter plate forming fluid passages to release the water flow between the first shutter plate and the second shutter plate.

2. The detachable coupling device of claim 1, wherein the male component is configured to attach the hose to the receiver of the fire hydrant.

3. The detachable coupling device of claim 1, wherein the receiver is an outlet for water flow from the hydrant.

4. The detachable coupling device of claim 1, wherein the male component includes an attachment element for connecting and disconnecting to the female component.

5. The detachable coupling device of claim 1, wherein the male component further includes a pair of opposing handles on an outer circumference of the male component.

6. The detachable coupling device of claim 1, wherein the first shutter is rotatable between an open position to open the fluid passages between the first shutter plate and the second shutter plate and release the water flow from the hydrant through the fluid passages, and a closed position to close the fluid passages and stop the water flow from the hydrant.

\* \* \* \* \*